UNITED STATES PATENT OFFICE.

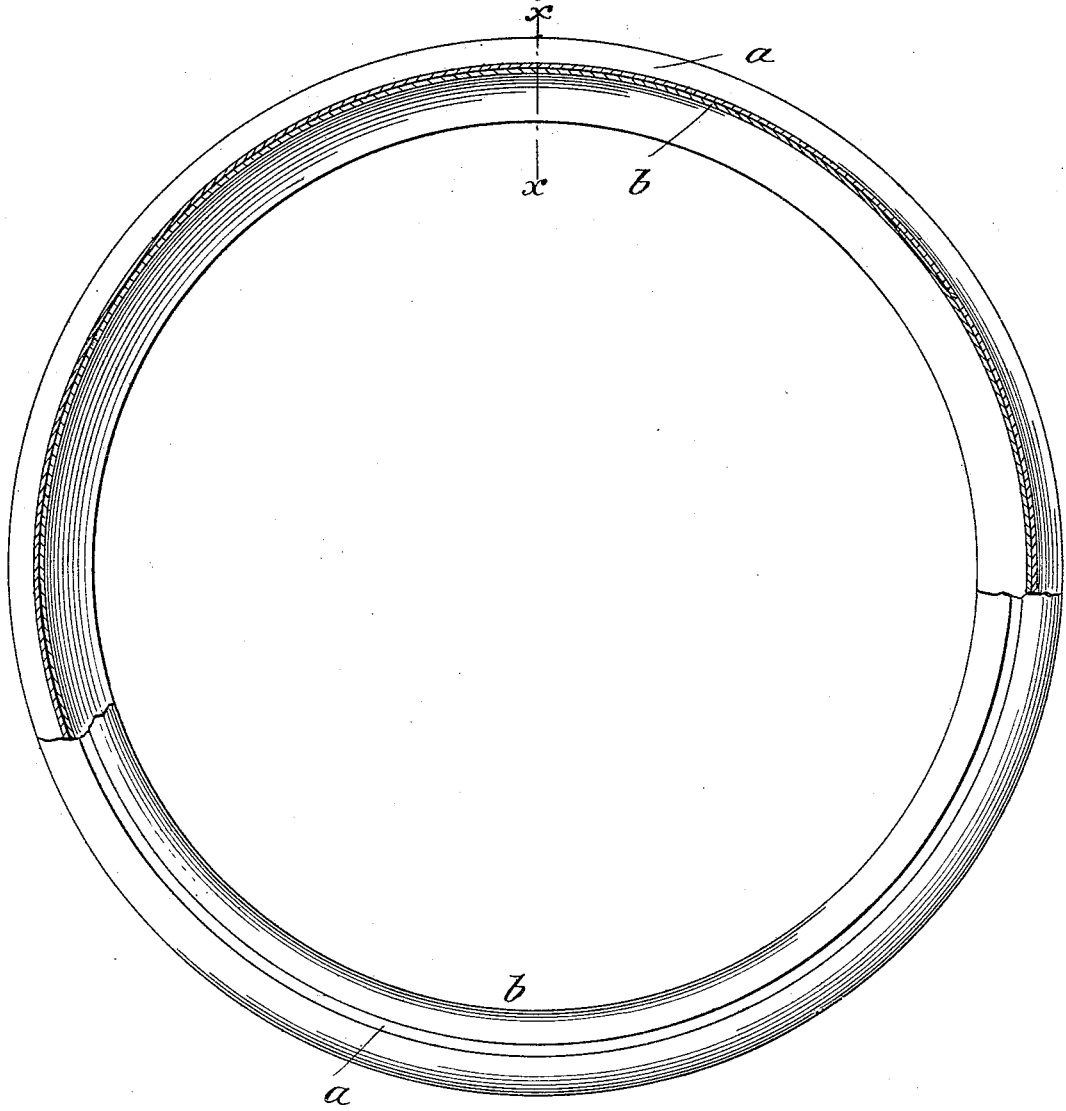

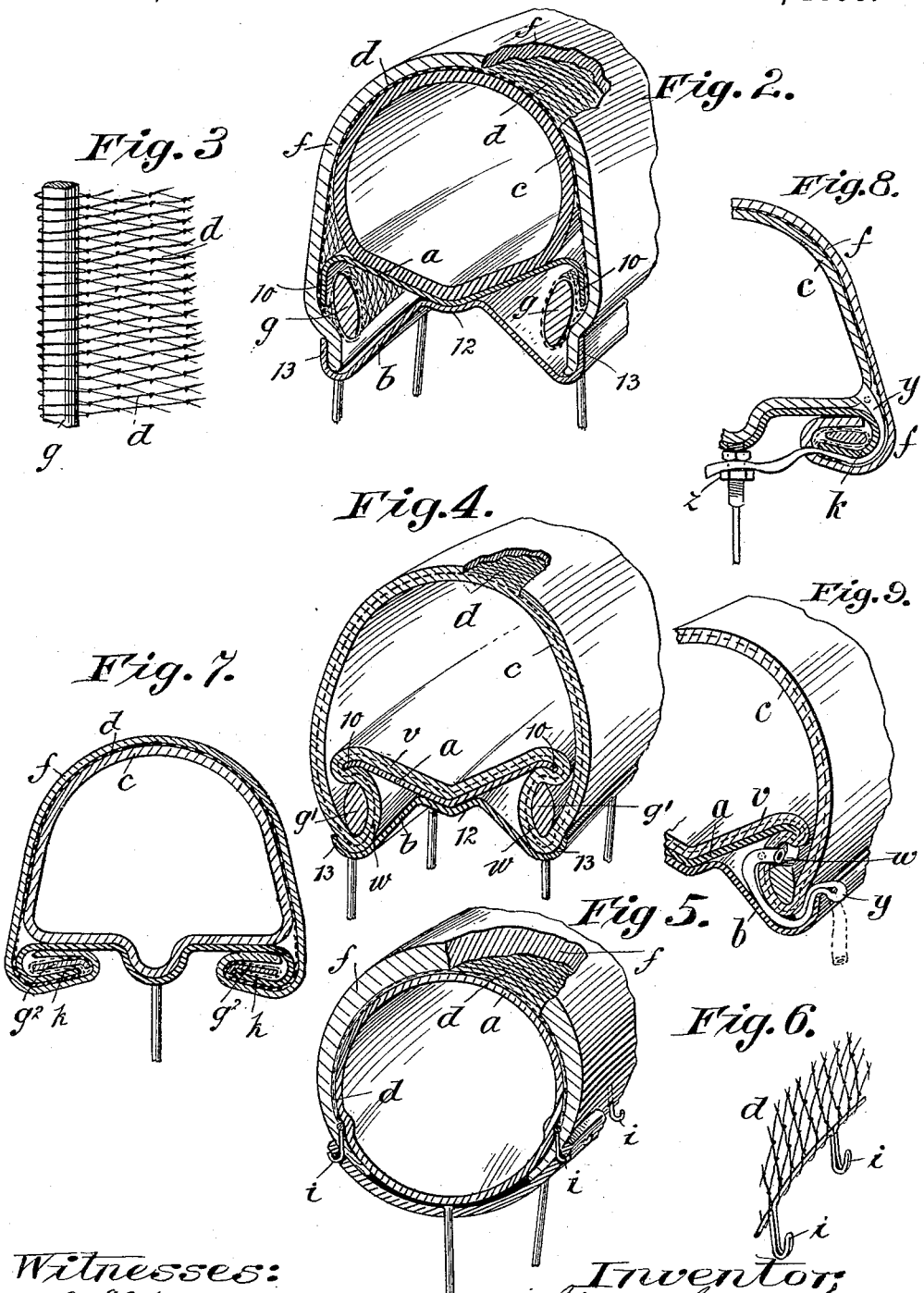

CHARLES E. DURYEA, OF SPRINGFIELD, MASSACHUSETTS.

PNEUMATIC TIRE.

SPECIFICATION forming part of Letters Patent No. 493,488, dated March 14, 1893.

Application filed September 5, 1892. Serial No. 445,037. (No model.)

*To all whom it may concern:*

Be it known that I, CHARLES E. DURYEA, a citizen of the United States, residing at Springfield, in the county of Hampden and State of Massachusetts, have invented new and useful Improvements in Vehicle-Wheels having Pneumatic Tires, of which the following is a specification.

This invention relates to improvements in wheels for vehicles having metallic rims, and pneumatic tires.

One of the purposes of the invention is to provide in the pneumatic tire a jacket or inclosure of sufficient strength to retain the air-ring in the desired form while under pressure and yet to peculiarly permit, on running over small objects, as pebbles, &c., the yielding or giving of the tire directly and considerably at the place of impact, instead of but a slight yielding of a considerable superficial tread portion of the tire and at the same time a bodily lifting of the wheel.

Another object of the invention is to provide a rim of improved construction with especial reference to the retention of the tire thereupon.

The invention is for the purpose, furthermore, of generally improving the rim and tire all as will hereinafter fully appear, especially with respect to the arrangement and operation of the tire inflating tube.

The invention consists in the construction or formation of certain of the parts, and the combination of parts all substantially as will hereinafter fully appear and be set forth in the claims.

In the accompanying drawings exemplifications of this invention are illustrated, Figure 1 being a partial side view and partial sectional view of the rim. Fig. 1ª is a cross section of the parts of the rim as taken on the line, $x$—$x$, Fig. 1, and separated from each other. Fig. 2 is a cross sectional and perspective view, on a larger scale, of the improved rim and tire. Fig. 3 is a view of the reticulated and flexible retaining and reinforcing covering for the air-tube, enlarged. Figs. 4 and 5 are views similar to Fig. 2, but showing the tire of somewhat different fabrication, the same, nevertheless, embodying the primary feature of the improved air-tube retaining cover, Fig. 6 being a perspective view of a portion of the retaining cover employed in the form of tire shown in Fig. 5. Fig. 7 is a cross sectional view of a tire embodying the present improvements, but applied on a different description of rim. Figs. 8 and 9 are sectional views showing in combination with the rim and tire the novel disposition or arrangement of the inflating tube.

The rim, shown in Figs. 1, 2, and 3, is formed of two annular sections, $a$ and $b$, the external one having a trough-like outer recess in which the tire may be seated; and the two sections are so formed and arranged at their sides as to constitute two annular recesses with contracted openings. The external section, $a$, is therefore longitudinally curved or bent, intermediately, to have imparted thereto the depression or channel for the seating of the tire, and has its edge portions turned angularly inwardly, more or less, to form the lips, as seen at 10, 10. The inner section, $b$, has a narrow middle portion, 12, thereof, bent or curved and then turned laterally and angularly to said middle portion and divergent to the portions of the section, $a$, which are next outside of its intermediate part, its edge portions, 13, being extended outwardly relative to the axial center of the rim toward the said inwardly turned portions, 10, 10, of the external section. The said annular rim sections, $a$, $b$, are preferably united by heating and expanding the outer one, placing it in its encircling position over the inner section and permitting it to cool and shrink thereupon, no brazing or other form of connection being necessary, although, if deemed advantageous by the constructor, the parts may be connected by brazing or riveting.

The pneumatic tire, as shown in Fig. 2, consists of the air-ring of rubber, $c$, seated on the rim of the form described. The tread and lateral surfaces of the tire are overlaid by the reticulated retaining layer, $d$, which consists of a band having a length to encircle the tire, and of a suitable width, formed of a series of widely spaced textile strands crossing each other preferably diagonally and knotted at their intersections. This net is confined at the sides of the rim and when the air-ring is inflated is under more or less tension according to the air-pressure established in the air-ring.

$f$ represents the shoe or tread section of the tire, which, in said Fig. 2, is shown as a belt of rubber or elastic compounds thereof, or combinations of such with fabric or other material, overlying the air-ring and its reticulated retaining cover and the side portions, 10, 10, of the external rim section and having its edge portions, 14, 14, turned within the lips, 13, 13, of the internal rim section, $b$. It will be noticed that said retaining cover, $d$, has its edge portions in engagement with strips, $g, g$, of suitable material such, for instance, as strawboard or other descriptions of vulcanized fiber, and such strip-provided edge portions are located within the annular side recesses of the rim and bear against the lips, 10, 10, and also against the inner surfaces of the edge portions of the shoe, $f$. As the tire is inflated to place the retaining covering, $d$, under tension, its draft upon the said strips, $g, g$, causes them to crowd quite forcibly against the lips, 10, 10, and outwardly against the said edge portions of the shoe to force it against the lips, 13, 13, of the rim section, $b$.

In Fig. 4 the air-tube and tread or shoe portion of the tire are all constituted by a single homogeneous ring of rubber in any of its approved elastic compounds, with the reticulated textile tube $d$ incorporated within the thickness thereof. This tire has a section, $v$, thereof re-entrant which is seated upon the external rim section, $a$, while cross-sectional bights, or hollow lobes, $w$, at each side of the rim are entered into the side recesses of the latter said parts, $w$, having, as partially filling cores therefor, strips, $g', g'$, of the light vulcanized fiber. The hollow portions of the tire within the side apertures of the rim are inflated as well as the main portion of the tire, and the tire receives support from both rim sections. These cores serve to secure, when the tire is expanded, the engagement thereof with the rim and while they may be omitted and the retention of the tire on the rim still be insured on the sufficient degree of inflation their employment is regarded advantageous.

In Fig. 5 the reticulated retaining cover for the air-tube is shown as covering the tread and lateral surfaces thereof and is overlaid by the shoe, $f$, very much as in Fig. 1, but the retaining cover, $d$, is provided with a series of hooks, $i, i$, at its edges, which extend through and upwardly beyond the shoe, $f$, near the edge portions thereof. The rim is of the most common form of single trough, and has perforations near its edges, with which the said hooks engage. When the tire is inflated the covering, $d$, and shoe, $f$, are drawn taut by the expansion of the air-tube which in turn is thereby held within the proper bounds. And in Fig. 7 the improved retaining cover is shown as in operative combination with a tire and single-section rim of a still further modified form, the reticulated retaining cover, nevertheless, performing its function with the same degree of efficiency as in the tire heretofore described. This rim has the inwardly return-bent edge portions to constitute the lips, $k, k$, with the space, between them and the main portion of the rim, having its orifice inward. The air-tube is seated on this rim and has the shoe, $f$, overlying the tire and the aforesaid kind of retaining cover, $d$. The edge portions of the retaining cover and the said shoe are carried around the lips, $k, k$, and entered within the annular spaces in part inclosed thereby, and key-pieces, $g^2, g^2$, of the light hardened fiber being also entered in said spaces and the orifices thereof being somewhat contracted, the inflation of the tire effects a clinch-engagement between the underturned edge portions of the rim and the edge portions of the shoe and the retaining cover.

I am aware that, as well as the common canvas jacket for the air-tube it has been proposed to employ wire gauze both as a strengthening and an armoring factor in the tire, but so far as I am aware there has never been combined with the air-tube a jacket or reinforcing and retaining portion which consists of approximately parallel textile strands connected one to another, as by knotting, and constituting a netting which, while sufficiently strong for retaining the tire within suitable bounds is on the other hand so flexible that the impact, at the tread, of small objects, as pebbles, may insure a considerable inward deflection of the air-tube only at or next within the place of contact with such pebbles, &c., instead of a slight deflection of the air-tube throughout a considerable area about the place of contact and consequently a slight bodily lifting of the wheel, as is the case in a tire having a canvas jacket.

I regard the knotting or positive connection of the cross-strands at each of the intersections as important and essential, for thereupon is largely dependent the successful results to be achieved by the employment of the netted part, $d$, of the tire. In the absence of the knotting the uniformity of arrangement of the textile strands would not be permanently maintained, for while some of the strands would come to lie closely together, others would be widely separated and such extensive interstices in the open work fabric would soon be formed as would permit protrusion here and there of the air-tube. It will be appreciated, where the retaining cover is closely woven, as in duck or canvas, that such a fabric constitutes a medium for the distribution of the deflecting pressure brought upon the air-tube on the running of the tire over a pebble or small inequality which it is the primary purpose of this invention to avoid.

It will be understood that in the drawings the illustration of the cover portion, $d$, for the tire, has the openings between the strands shown as of exaggerated extent for in practice, the strands running in one direction are almost or quite in contact while those running crosswise have their knotted intersections at regular intervals of separation which is equal to several times the diameter of each strand.

In Figs. 8 and 9 the novel combination with the rim of the inflatable tire having the flexible and collapsible inflating tube, is shown, whereby the inflated condition of the tire assures the closing of said collapsible inflating tube by reason of the tire having some portion thereof,—either the part directly comprising the air-ring, or the shoe or cover therefor,—in contact with the inflating tube to force it with a constrictive action against the adjacent part of the rim.

In Fig. 8 the rim is of the same form shown in Fig. 7 with the inflating tube, $y$, which is connected to the air-ring, $c$, extending outwardly from a lateral base portion thereof around the underturned lip, $k$, of the rim, being overlaid by the edge portion of the shoe, $f$, which is connected with this description of rim in the manner hereinbefore set forth. During the inflation a suitable form of mechanical clamp is to be applied at the inner side of the rim and the tread of the tire adjacent the inflating tube, for the purpose of temporarily relieving the tension upon the shoe, $f$, at this place. The inflation of the tire, under the suitable pressure, having been accomplished the clamp is to be removed when the tension on the shoe or cover will effect the absolute closing of the said tube, as indicated in the drawings. Substantially the same manner of means and effect is illustrated in Fig. 9, in connection, however, with the construction of rim and tire shown in Fig. 4. Here also the inflation may be effected by temporarily compressing the tire by clamping adjacent the valve, and it will be furthermore seen that the end of the inflating tube is inwardly turned to lie upon a portion thereof which is between the rim and tire so that the construction of the inflating tube may, by the air pressure within the tire, be brought against two portions of said tube, doubly increasing the effectiveness of the closure thereof.

With the inflating tube disposed between the tire and rim, and protruding, or adapted to protrude, substantially as described, as the tire creeps around on the rim the tube may move correspondingly therewith, there being no liability of the said tube being strained, cut off or loosened in its connection with the tire, as has been found the case where the inflating tube has been passed through a hole therefor in the rim. The disposition of the free end of the inflating tube closely against the rim secures the exclusion of dust during the time of riding, and as means for confining the free end of the said tube, besides that constituted by the contacting clamping portions of the tire and rim, seen in Fig. 9, between which portions the free end of the tube is tucked, such end, as shown in Fig. 8, may be entered between a screw washer, $z$, on an adjacent spoke nipple, the tube from such point of confinement to the place of sidewise entrance between the rim and tire being somewhat slack to permit the creeping of the tire.

Having now described my invention, what I claim, and desire to secure by Letters Patent, is—

1. A pneumatic tire comprising an air-tube and a retaining portion which consists of textile strands knotted together at suitable intervals, substantially as and for the purpose set forth.

2. In a pneumatic tire the combination with the air-tube of the retaining section consisting of flexible strands positively united, as by knotting, at suitable intervals, and the outer elastic tread cover or shoe, substantially as described.

3. The combination with a rim, of the air-tube of a pneumatic tire seated thereon, a retaining portion consisting of flexible strands positively united at suitable intervals, which portion overlies the air-ring and has its edge portions in engagement with the sides of the rim, and the tread cover or shoe for the tire, substantially as described.

4. The combination with a rim having at its side an annular recess with lips thereof turned toward each other to form a contracted orifice for said recess, of an inflatable air-ring encircling and seated on said rim, the retaining cover, $d$, substantially as described, and the tread cover or shoe having their edge portions at one side secured to one side of the rim, and the shoe having its other edge portion extended into said recess and lying against one of said lips, and the said retaining cover having its other edge portion extended into said rim-recess and connected to a strip, $g$, which is located therein to lie against the other of said lips and against the adjacent edge portion of the shoe, substantially as and for the purposes set forth.

5. For a pneumatic tire a retaining band consisting of strands of textile united material at suitable intervals, said band being provided at their edges with bead-forming strips, $g$, substantially as described.

6. The combination with a rim having at each side the outwardly opening recess, with a contracted orifice, of the air-tube, the retaining cover, $d$, substantially as described, with the edge strips, $g$, $g$, and the tread-shoe having its edge portions and the beaded edge portions of the retaining cover, $d$, entered and engaged within the said side recesses of the rim, substantially as and for the purposes set forth.

7. A rim consisting of external and internal annular sections, the former being of an outwardly open trough form with edge lips turned inwardly toward its axial center, and the internal section being in the form of an inwardly opening trough encircled by and having the intermediate portion of its outer surface in contact with and secured to the intermediate inner surface of the external section and said internal section having edge lips turned toward the lips of the external section to form the side recesses with the contracted orifices, substantially as described.

8. A rim consisting of an external, annular section of outwardly opening trough form with annular edge lips inwardly turned and an internal section of inwardly opening trough form and having at the edge portions the outwardly turned annular lips, the external section having the intermediate portion of its inner surface encircling and in contact with the intermediate portion of the internal section and secured to said internal section by heating and shrinking on, substantially as described.

9. In combination, a rim and a pneumatic tire and an inflating tube arranged to lie between the rim and a portion of the tire and to be automatically closed by the pressure of the portion of the tire in contact therewith, which forces same against the rim, substantially as described.

10. In combination, a rim and a pneumatic tire and an inflating tube arranged to lie between the rim and a portion of the tire and have a portion extended beyond the rim and to be automatically closed by the pressure of the portion of the tire in contact therewith which forces same against the rim, and means for confining the free end of said tube closely against the rim, substantially as described.

11. In combination, a rim and a pneumatic tire, and an inflating tube for the air-ring of the tire arranged to lie between the rim and a portion of the tire, said tube having a portion which is extended outwardly beyond the rim and tire and adapted to be inturned upon its portion which is between the rim and tire portion, and to be automatically closed by the inflation pressure upon the portion of the tire in contact therewith, substantially as described.

CHARLES E. DURYEA.

Witnesses:
W. S. BELLOWS,
J. D. GARFIELD.